(12) United States Patent
Wada

(10) Patent No.: US 9,212,596 B1
(45) Date of Patent: Dec. 15, 2015

(54) SPHERICAL ANNULAR SEAL MEMBER

(71) Applicant: OILES CORPORATION, Tokyo (JP)

(72) Inventor: Hiroaki Wada, Fujisawa (JP)

(73) Assignee: Oiles Corporation, Tokyo (JP)

( * ) Notice: Subject to any disclaimer, the term of this patent is extended or adjusted under 35 U.S.C. 154(b) by 0 days.

(21) Appl. No.: 14/758,045

(22) PCT Filed: Dec. 18, 2013

(86) PCT No.: PCT/JP2013/007435
§ 371 (c)(1),
(2) Date: Jun. 26, 2015

(87) PCT Pub. No.: WO2014/103249
PCT Pub. Date: Jul. 3, 2014

(30) Foreign Application Priority Data

Dec. 27, 2012 (JP) ................................ 2012-285403

(51) Int. Cl.
*F16J 15/12* (2006.01)
*F01N 13/18* (2010.01)
*F01N 13/16* (2010.01)
*F16J 15/08* (2006.01)

(52) U.S. Cl.
CPC ............ *F01N 13/1827* (2013.01); *F01N 13/16* (2013.01); *F16J 15/0812* (2013.01); *F16J 15/126* (2013.01)

(58) Field of Classification Search
CPC ...... F16J 15/126; F16J 15/0812; F16L 23/18; F01N 13/1827
See application file for complete search history.

(56) References Cited

U.S. PATENT DOCUMENTS

| 4,607,851 | A * | 8/1986 | Usher ..................... F01N 13/16 264/258 |
| 7,063,330 | B2 * | 6/2006 | Kubota ................. F16L 27/073 277/627 |
| 2004/0207162 | A1* | 10/2004 | Kubota ................. F16J 15/126 277/650 |
| 2010/0253011 | A1* | 10/2010 | Maeda .................... F01N 13/08 277/626 |
| 2010/0270754 | A1* | 10/2010 | Kubota ............... F01N 13/1827 277/608 |
| 2014/0027986 | A1* | 1/2014 | Miyashita ........... F01N 13/1827 277/626 |

FOREIGN PATENT DOCUMENTS

| JP | 62-220770 | 9/1987 |
| JP | 7-139673 | 5/1995 |
| JP | 10-231934 | 9/1998 |
| JP | 2006-29369 | 2/2006 |
| WO | WO 2012/053168 A1 | 4/2012 |
| WO | WO 2012/140686 A1 | 10/2012 |

OTHER PUBLICATIONS

International Search Report for PCT/JP2013/007435, mailed Apr. 1, 2014, 2 pages.

\* cited by examiner

*Primary Examiner* — Gilbert Lee
(74) *Attorney, Agent, or Firm* — Nixon & Vanderhye P.C.

(57) ABSTRACT

A spherical annular seal member 35 for use in an exhaust pipe joint has a spherical annular base member 33 which is defined by a cylindrical inner surface 29 forming a through hole 28, a partially convex spherical sliding surface 39, and annular end faces 31 and 32 on large- and small-diameter sides of the partially convex spherical sliding surface 39.

13 Claims, 11 Drawing Sheets (a)

(b)

(a)

(b)

(a)　　　　　　　　　　　　　　(b)

SPHERICAL ANNULAR SEAL MEMBER

This application is the U.S. national phase of International Application No. PCT/JP2013/007435 filed 18 Dec. 2013 which designated the U.S. and claims priority to JP Patent Application No. 2012-285403 filed 27 Dec. 2012, the entire contents of each of which are hereby incorporated by reference.

TECHNICAL FIELD

The present invention relates to a spherical annular seal member which is used in a spherical pipe joint for an automobile exhaust pipe.

BACKGROUND ART

Exhaust gases of an automobile engine are released to the atmosphere through an exhaust pipe, and this exhaust pipe is subjected to repeated stress owing to such as the roll behavior and vibration of the engine, with the result that there is a possibility of causing a fatigue failure of the exhaust pipe, and there are also cases where the engine vibration causes the exhaust pipe to resonate, thereby deteriorating the quietness of the compartment interior. To overcome such problems, a means has been adopted to absorb the stress by disposing a spherical pipe joint at a predetermined portion of the exhaust pipe.

In Patent Document 1, for example, a spherical annular seal member is proposed which has a cylindrical inner surface defining a through hole in a central portion thereof, an outer surface formed in the shape of a partially convex spherical surface, and annular end faces on large- and small-diameter sides of the outer surface. In its inner portion extending from the cylindrical inner surface to the outer surface formed in the shape of the partially convex spherical surface, the spherical annular seal member has a reinforcing member made from a compressed metal wire net sheet, as well as a heat-resistant material which contains expanded graphite, fills meshes of the metal wire net sheet of this reinforcing member, and is compressed in such a manner as to be formed integrally with the metal wire net sheet of the reinforcing member in mixed form.

PRIOR ART DOCUMENTS

Patent Document

Patent Document 1: JP-A-10-231934

SUMMARY OF THE INVENTION

Problems to be Solved by the Invention

Meanwhile, in the case where such a spherical annular seal member is used as the exhaust pipe joint, in the assembly to the exhaust pipe, the exhaust pipe is press fitted into the through hole of the spherical annular seal member, and in the use after the assembly the outer surface formed in the shape of the partially convex spherical surface repeatedly undergoes sliding movement with respect to the mating member, so that it is desired that the cylindrical reinforcing member be bound to the heat-resistant material compressed and containing expanded graphite to such an extent that the cylindrical reinforcing member is not positionally displaced at the time of press fitting and sliding contact. In addition, in the assembly to the exhaust pipe, even in cases where there arises a need to withdraw the exhaust pipe from the through hole of the spherical annular seal member after the press fitting of the exhaust pipe into the through hole of the spherical annular seal member, it is also desired that the cylindrical reinforcing member be bound to the heat-resistant material to such an extent that the cylindrical reinforcing member is not positionally displaced with respect to the heat-resistant material compressed and containing expanded graphite.

The present invention has been devised on the basis of the above-described aspects, and its object is to provide a spherical annular seal member in which the reinforcing member made from the metal wire net sheet is firmly bound to the heat-resistant material compressed and containing expanded graphite.

Means for Overcoming the Problems

A spherical annular seal member in accordance with the present invention for use in an exhaust pipe joint comprises: a spherical annular base member defined by a cylindrical inner surface forming a through hole, a partially convex spherical sliding surface, and annular end faces on large- and small-diameter sides of the partially convex spherical sliding surface, wherein the spherical annular base member includes a heat-resistant material containing expanded graphite and compressed and a reinforcing member made from a convoluted and compressed metal wire net sheet, the heat-resistant material containing expanded graphite fills meshes of the compressed metal wire net sheet and is integrated with the metal wire net sheet in mixed form, and the metal wire net sheet which extends along at least one annular end face of the large- and small-diameter side annular end faces and is exposed to an outside partially and discretely at the one annular end face is constituted by a bent extended portion of an innermost circumferential metal wire net sheet extending along the cylindrical inner surface.

According to the spherical annular seal member in accordance with the present invention, since the metal wire net sheet which extends along at least one annular end face of the large- and small-diameter side annular end faces and is exposed to the outside partially and discretely at the one annular end face is constituted by a bent extended portion of an innermost circumferential metal wire net sheet extending along the cylindrical inner surface, when the exhaust pipe is press fitted into the through hole of the spherical annular seal member and the exhaust pipe is withdrawn from the through hole of the spherical annular seal member, that bent extended portion acts as a hampering portion which resists the frictional movement with respect to the heat-resistant material, containing expanded graphite, of the innermost circumferential metal wire net sheet extending along the cylindrical inner surface, and is able to firmly bind the reinforcing member constituted by the metal wire net sheet to the heat-resistant material compressed and containing expanded graphite. Thus, it is possible to prevent positional displacement between the innermost circumferential metal wire net sheet and the heat-resistant material containing expanded graphite around that innermost circumferential metal wire net sheet.

In the spherical annular seal member in accordance with the present invention, the bent extended portion may extend to a proximal side of a large-diameter side annular end of the partially convex spherical sliding surface, or in substitution therefor or in conjunction therewith may extend to a proximal side of a small-diameter side annular end of the partially convex spherical sliding surface.

A spherical annular seal member in accordance with another aspect of the present invention for use in an exhaust pipe joint comprises: a spherical annular base member defined by a cylindrical inner surface forming a through hole, a partially convex spherical sliding surface, and annular end faces on large- and small-diameter sides of the partially convex spherical sliding surface, wherein the spherical annular base member includes a heat-resistant material containing expanded graphite and compressed and a reinforcing member made from a convoluted and compressed metal wire net sheet, the heat-resistant material containing expanded graphite fills meshes of the compressed metal wire net sheet and is integrated with the metal wire net sheet in mixed form, and the metal wire net sheet which extends along at least one annular end face of the large- and small-diameter side annular end faces and is exposed to an outside partially and discretely at the one annular end face is constituted by a bent extended portion of an outermost circumferential metal wire net sheet extending along partially convex spherical sliding surface.

According to the spherical annular seal member in accordance with the other aspect of the present invention, since the metal wire net sheet which extends along at least one annular end face of the large- and small-diameter side annular end faces and is exposed to the outside partially and discretely at the one annular end face is constituted by a bent extended portion of an outermost circumferential metal wire net sheet extending along partially convex spherical sliding surface, in the sliding of the partially convex spherical sliding surface with respect to the mating member, that bent extended portion acts as a hampering portion which resists the frictional movement with respect to the heat-resistant material, containing expanded graphite, of the outermost circumferential metal wire net sheet extending along the partially convex spherical sliding surface, and is able to firmly bind the reinforcing member constituted by the metal wire net sheet to the heat-resistant material compressed and containing expanded graphite. Thus, it is possible to prevent positional displacement between the outermost circumferential metal wire net sheet and the heat-resistant material containing expanded graphite around that outermost circumferential metal wire net sheet.

In the spherical annular seal member in accordance with the other aspect of the present invention, the bent extended portion may extend to a proximal side of an axial annular end of the cylindrical inner surface at the large-diameter side annular end face, or in substitution therefor or in conjunction therewith may extend to a proximal side of another axial annular end of the cylindrical inner surface at the small-diameter side annular end face.

In each of the spherical annular seal members in accordance with the present invention, the large-diameter side annular end face may be constituted by an annular flat end face which is continuously connected at an annular large-diameter edge thereof to a large-diameter side annular end of the partially convex spherical sliding surface and which is continuously connected at an annular small-diameter edge thereof to one annular axial end of the cylindrical inner surface, or in substitution therefor or in conjunction therewith, may include an annular flat end face portion which is continuously connected at an annular large-diameter edge thereof to the large-diameter side annular end of the partially convex spherical sliding surface and an annular concave end face portion which is continuously connected at a large-diameter edge thereof to an annular small-diameter edge of the annular flat end face portion and is continuously connected at a small-diameter edge thereof to the one annular axial end of the cylindrical inner surface. Still alternately, in substitution therefor or in conjunction therewith, the large-diameter side annular end face may include an annular flat end face portion which is continuously connected at an annular small-diameter edge thereof to the one annular axial end of the cylindrical inner surface and an annular concave end face portion which is continuously connected at a small-diameter edge thereof to an annular large-diameter edge of the annular flat end face portion and is continuously connected at a large-diameter edge thereof to the large-diameter side annular end of the partially convex spherical sliding surface. Still further, in substitution therefor or in conjunction therewith, the large-diameter side annular end face may include an annular concave end face portion which is continuously connected at an annular large-diameter edge thereof to the large-diameter side annular end of the partially convex spherical sliding surface, an annular flat end face portion which is continuously connected at a large-diameter edge thereof to a small-diameter edge of the concave end face portion, and an annular concave end face portion which is continuously connected at a large-diameter edge thereof to an annular small-diameter edge of the annular flat end face portion and is continuously connected at a small-diameter edge thereof to the one annular axial end of the cylindrical inner surface.

In each of the spherical annular seal members in accordance with the present invention, the spherical annular base member may include a spherical annular base member body and an outer layer formed on an outer peripheral side of the spherical annular base member body, and, in the outer layer, the heat-resistant material containing expanded graphite, a solid lubricant consisting of a lubricating composition containing at least hexagonal boron nitride and hydrated alumina, and the reinforcing member made from the metal wire net sheet are compressed such that the solid lubricant and the heat-resistant material are filled in the meshes of the reinforcing member, and such that the solid lubricant, the heat-resistant material, and the reinforcing member are integrated in mixed form, an outer surface of the outer layer forming the partially convex spherical sliding surface, the partially convex spherical sliding surface being formed into a smooth surface in which surface constituted by the reinforcing member and surface constituted by the solid lubricant are present in mixed form or into a smooth surface constituted by the solid lubricant.

According to such a spherical annular seal member, it is possible to avoid the dropping off of the solid lubricant from the outer surface of the spherical annular base member body, with the result that since the sliding with the mating member takes place at the partially convex spherical sliding surface which is a smooth surface where the solid lubricant and the reinforcing member are present in mixed form, it is possible to prevent the generation of abnormal frictional noise as practically as possible.

In the solid lubricant, hexagonal boron nitride exhibits excellent lubricity particularly in the high-temperature region. In addition, hydrated alumina itself among the components exhibits no lubricity, but exhibits an effect in the formation of a firm coating layer by improving the adhesiveness of the solid lubricant onto the heat-resistant material surface, and exhibits the role of deriving the lubricity of the hexagonal boron nitride by promoting sliding between layers of plate crystals of the hexagonal boron nitride.

The lubricating composition may contain a polytetrafluoroethylene resin. The polytetrafluoroethylene resin itself has a low frictional property, and as it is contained in the lubricating composition, the polytetrafluoroethylene resin improves the low frictional property of the lubricating composition, imparts the low frictional property to the solid lubricant constituted of a lubricating composition, and is capable of avoiding as practically as possible the generation of abnormal frictional noise in the friction with the mating member without causing stick-slip (adhesion-slippage). Further, the polytetrafluoroethylene resin imparts to the lubricating composition the action of enhancing the ductility of the lubricating composition during compression forming, with the result that the formation of a thin coating layer is made possible.

The hydrated alumina is a compound which is expressed by a composition formula: $Al_2O_3 \cdot nH_2O$ (in the composition formula, $0<n<3$). In this composition formula, n is normally a number exceeding 0 (zero) and less than 3, preferably 0.5 to 2, more preferably 0.7 to 1.5 or thereabouts. As the hydrated alumina, it is possible to cite, for example, alumina monohydrate (aluminum hydroxide oxide) such as boehmite ($Al_2O_3 \cdot nH_2O$) and diaspore ($Al_2O_3 \cdot H_2O$), alumina trihydrate such as gibbsite ($Al_2O_3 \cdot 3H_2O$) and bayerite ($Al_2O_3 \cdot 3H_2O$), pseudoboehmite, and the like, and at least one of them is suitably used.

In the spherical annular seal member in accordance with the present invention, the spherical annular base member body and the outer layer may contain the reinforcing member constituted by the metal wire net sheet at a ratio of 40 to 65% by weight and the heat-resistant material containing expanded graphite and the solid lubricant at a ratio of 35 to 60% by weight. The heat-resistant material and the solid lubricant in the spherical annular base member body and the outer layer may preferably have a density of 1.20 to 2.00 $Mg/m^3$. In addition, the outer layer may preferably contain the reinforcing member constituted by the metal wire net sheet at a ratio of 60 to 75% by weight and the heat-resistant material containing expanded graphite and the solid lubricant at a ratio of 25 to 40% by weight.

If the spherical annular base member body and the outer layer contain the reinforcing member by more than 65% by weight and the heat-resistant material by less than 35% by weight, the sealing (filling) of a multiplicity of infinitesimal passages (gaps) occurring around the reinforcing member by the heat-resistant material is not effected completely, with the result that leakage of exhaust gases can occur at an early period, and even of the sealing of the infinitesimal passages happened to be effected completely, such sealing can be lost at an early period due to the oxidative wear and the like of the heat-resistant material under high temperatures, leading to the leakage of exhaust gases at an early period. Meanwhile, if the reinforcing member is contained by less than 40% by weight, and the heat-resistant material is contained by more than 60% by weight, the amount of reinforcing member contained becomes quite small in the outer layer and in the vicinity of the outer layer, and the reinforcement of the heat-resistant material in the outer layer and in the vicinity of the outer layer fails to be effected satisfactorily, which can result in the noticeable occurrence of exfoliation (dropping off) of the heat-resistant material and makes it difficult to expect the effect of reinforcement by the reinforcing member.

In addition, as for the heat-resistant material and the solid lubricant in the spherical annular base member body and the outer layer, if the heat-resistant material has a density of less than 1.20 $Mg/m^3$, the leakage of exhaust gases can result over extended periods of use, whereas if the heat-resistant material has a density of greater than 2.00 $Mg/m^3$, abnormal frictional noise is frequently liable to occur in the friction with the mating member.

In the spherical annular seal member in accordance with the present invention, since the outer layer has the partially convex spherical sliding surface constituted by the outer surface which is formed by an exposed surface where surface constituted by the reinforcing member and surface constituted by the solid lubricant are present in mixed form, it is possible to ensure smoother sliding with the mating member which is in contact (slides) with that partially convex spherical sliding surface. In addition, the surface constituted by the solid lubricant in the that partially convex spherical sliding surface can be held by the surface constituted by the reinforcing member, and it is possible to appropriately effect both the transfer of the solid lubricant from that partially convex spherical sliding surface onto the surface of the mating member and the scraping off of an excessive solid lubricant transferred onto the surface of the mating member, with the result that it is possible to ensure smooth sliding over extended periods of time, and the generation of abnormal frictional noise in sliding with the mating member can be eliminated.

In the spherical annular seal member in accordance with the present invention, the heat-resistant material may contain at least one of 0.05 to 5.0% by weight of phosphorus pentoxide and 1.0 to 16.0% by weight of a phosphate as an oxidation inhibitor, and expanded graphite.

The heat-resistant material containing at least one of phosphorus pentoxide and a phosphate as an oxidation inhibitor and expanded graphite is able to improve the heat resistance and oxidative wear characteristics of the spherical annular seal member itself, and permits the use of the spherical annular seal member in a high-temperature region.

Advantages of the Invention

According to the present invention, it is possible to provide a spherical annular seal member in which the cylindrical reinforcing member is firmly bound to the spherical annular base member body.

BRIEF DESCRIPTION OF THE DRAWINGS

Parts (a) and (b) of FIG. 1 are explanatory views of an embodiment of the present invention.

MODE FOR CARRYING OUT THE INVENTION

Figure 1:
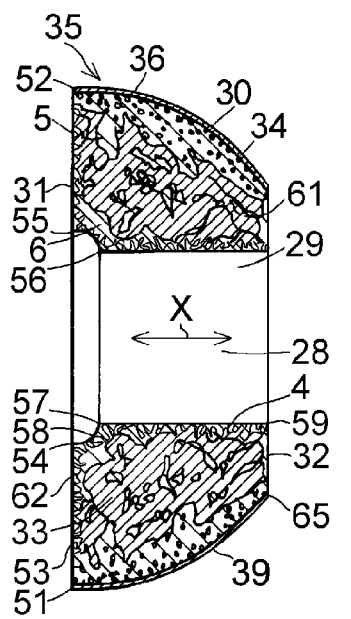
Figure 1:
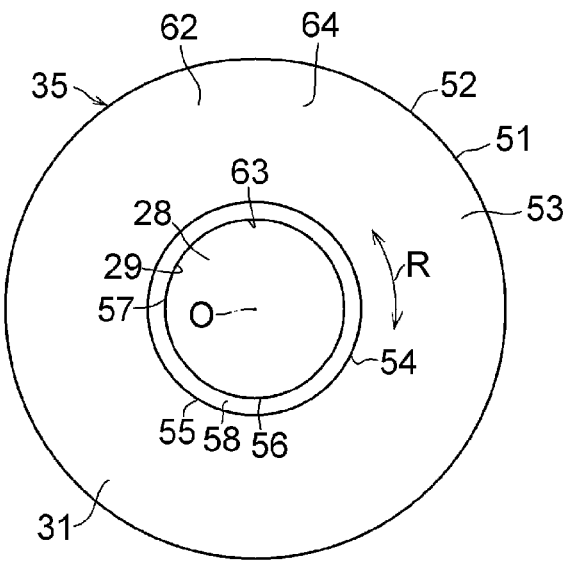

Next, a more detailed description will be given of the present invention on the basis of the preferred embodiments illustrated in the drawings. It should be noted that the present invention is not limited to these embodiments.

Figure 2:
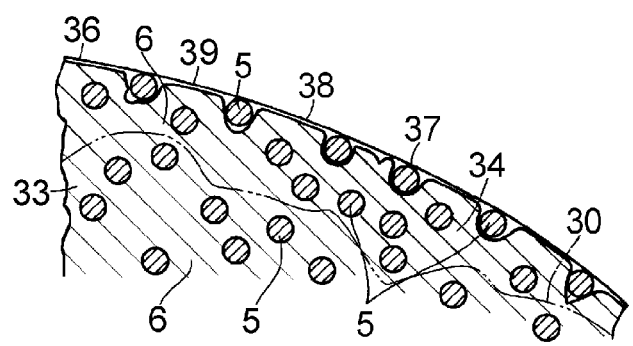
FIG. 2 is a partially enlarged explanatory view of a spherical annular seal member shown in FIG. 1.

In FIGS. 1 and 2, a spherical annular seal member 35 which is used in the exhaust pipe joint in accordance with this embodiment has a spherical annular base member 33 which is defined by a cylindrical inner surface 29 forming a through hole 28, a partially convex spherical sliding surface 39, and annular end faces 31 and 32 on large- and small-diameter sides of the partially convex spherical sliding surface 39.

The spherical annular base member 33 includes a reinforcing member 5 made from a convoluted and compressed metal wire net sheet 4 and a heat-resistant material 6 containing expanded graphite and compressed in such a manner as to fill meshes of the compressed metal wire net sheet 4 and to be integrated with the metal wire net sheet 4 in mixed form, and this spherical annular base member 33 includes a spherical annular base member body 61 which is cylindrically shaped and has a partially convex spherical surface 30 on an outer peripheral side thereof, as well as an outer layer 34 formed integrally on the partially convex spherical surface 30 of the spherical annular base member body 61.

To ensure that a clearance is not produced with respect to a cylindrical outer surface 46 of a pipe end portion 101 of an inserted upstream-side exhaust pipe 100 (see FIG. 18), the cylindrical inner surface 29 having an axis O has a substantially identical inside diameter to the outside diameter of the cylindrical outer surface 46.

The annular end face 31 has an annular flat end face portion 53 which is continuously connected at an annular large-diameter edge 51 to a large-diameter side annular end 52 of the partially convex spherical sliding surface 39, as well as an annular concave end face portion 58 which is continuously connected at a large-diameter edge 55 to an annular small-diameter edge 54 of the annular flat end face portion 53 and is continuously connected at a small-diameter edge 56 to an annular end 57 in the axial direction X of the cylindrical inner surface 29.

That portion of the metal wire net sheet 4 which extends along the annular end face 31 and is exposed to the outside partially and discretely at that annular end face 31 constitutes a bent extended portion 62 of an innermost circumferential metal wire net sheet 4 extending along the cylindrical inner surface 29, and the bent extended portion 62 extends to a proximal side of the annular end 52 of the partially convex spherical sliding surface 39.

Hereafter, a description will be given of constituent materials of the spherical annular seal member 35 and a method of manufacturing the spherical annular seal member 35.

<Concerning Heat-Resistant Sheet Material I for Heat-Resistant Material>

While concentrated sulfuric acid of a 98% concentration is being agitated, a 60% aqueous solution of hydrogen peroxide is added to it as an oxidizing agent, and this solution is used as a reaction solution. This reaction solution is cooled and kept at a temperature of 10° C., natural flake graphite powder having a particle size of 30 to 80 meshes is added to it, and reaction is allowed to take place for 30 minutes. After the reaction, acid-treated graphite powder is separated by suction filtration, and a cleaning operation is repeated twice in which the acid-treated graphite powder is agitated in water for 10 minutes and is then subjected to suction filtration, thereby sufficiently removing the sulfuric acid content from the acid-treated graphite powder. Then, the acid-treated graphite powder with the sulfuric acid content sufficiently removed is dried for 3 hours in a drying furnace held at a temperature of 110° C., and this is used as an acid-treated graphite powder.

This acid-treated graphite powder is subjected to heating (expansion) treatment for 1 to 10 seconds at temperatures of 950 to 1200° C. to produce cracked gas. The gaps between graphite layers are expanded by its gas pressure to form expanded graphite particles (expansion rate: 240 to 300 times). These expanded graphite particles are fed to a twin roller apparatus adjusted to a desired roll nip and is subjected to roll forming, thereby fabricating an expanded graphite sheet having a desired thickness. This expanded graphite sheet is used as a heat-resistant material I.

<Concerning Heat-Resistant Materials II and III for Heat-Resistant Material>

While the above-described acid-treated graphite powder is being agitated, a solution in which at least one of an aqueous solution of orthophosphoric acid of an 84% concentration as a phosphoric acid and an aqueous solution aluminum primary phosphate of a 50% concentration as a phosphate is diluted with methanol is compounded with this acid-treated graphite powder by spraying, and is agitated uniformly to fabricate a mixture having wettability. This mixture having wettability is dried for two hours in a drying furnace held at a temperature of 120° C. Then, this mixture is subjected to heating (expansion) treatment for 1 to 10 seconds at temperatures of 950 to 1200° C. to produce cracked gas. The gaps between graphite layers are expanded by its gas pressure to form expanded graphite particles (expansion rate: 240 to 300 times). In this expansion treatment process, the orthophosphoric acid among the components undergoes dehydration reaction and produces phosphorus pentaoxide, and water in the structural formula of aluminum primary phosphate is eliminated. These expanded graphite particles are fed to the twin roller apparatus adjusted to a desired roll nip and is subjected to roll forming, thereby fabricating an expanded graphite sheet having a desired thickness. These expanded graphite sheets are used as heat-resistant materials II and III.

Phosphorus pentaoxide or aluminum primary phosphate is contained in the heat-resistant material II thus fabricated, and phosphorus pentaoxide and aluminum primary phosphate are contained in the heat-resistant material III. The expanded graphite containing at least one of phosphorus pentaoxide and aluminum primary phosphate permits use at, for instance, 500° C. or a high-temperature region exceeding 500° C. since the heat resistance of the expanded graphite itself is improved and the oxidation inhibiting action is imparted thereto.

As the phosphate which can be used, it is possible to cite, in addition to the orthophosphoric acid, metaphosphoric acid, polyphosphoric acid, polymetaphosphate, and the like. In addition, as the phosphate, it is possible to cite, in addition to the aluminum primary phosphate, lithium primary phosphate, lithium secondary phosphate, calcium primary phosphate, calcium secondary phosphate, aluminum secondary phosphate, and the like.

In the manufacture of the spherical annular seal member 35, as the heat-resistant sheet material, a sheet material having a density of 1.0 to 1.15 $Mg/m^3$ or thereabouts and a thickness of 0.3 to 0.6 mm or thereabouts is preferably used.

<Concerning Reinforcing Member>

As a reinforcing member, a metal wire net sheet is used which is formed by weaving or knitting one or more fine metal wires including, as an iron-based wire, a stainless steel wire made of such as austenitic stainless steels SUS 304, SUS 310S, and SUS 316, a ferritic stainless steel SUS 430, or an iron wire (JIS-G-3532) or a galvanized steel wire (JIS-G-3547), or, as a copper wire, a wire member made of a copper-nickel alloy (cupro-nickel) wire, a copper-nickel-zinc alloy (nickel silver) wire, a brass wire, or a beryllium copper wire.

Figure 4:
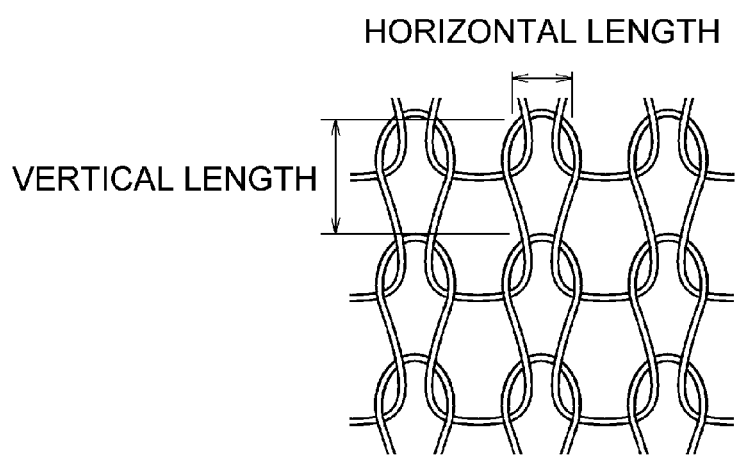
FIG. 4 is a plan view illustrating meshes of a metal wire net sheet of the reinforcing member.

As the fine metal wire for forming the metal wire net sheet, a fine metal wire whose diameter is 0.28 to 3.2 mm or thereabouts is used. In terms of the mesh size of the metal wire net sheet (see FIG. 4 illustrating a woven metal wire net sheet) for a spherical annular base member formed by the fine metal wire of that diameter, a mesh size of 4 to 6 mm long and 3 to 5 mm wide or thereabouts is suitably used, whereas, in terms of the mesh size (see FIG. 4) of the metal wire net sheet for an outer layer, a mesh size of 2.5 to 3.5 mm long and 1.5 to 5 mm wide or thereabouts is suitably used.

<Concerning Solid Lubricant>

A solid lubricant in this embodiment contains 70 to 85% by weight of a hexagonal boron nitride (hereafter abbreviated as 'h-BN'), 0.1 to 10% by weight of boron oxide, and 5 to 20% by weight of hydrated alumina, or contains a polytetrafluoroethylene resin (hereafter referred to as PTFE) powder at a ratio of not more than 200 parts by weight, preferably 50 to 150 parts by weight, with respect to 100 parts by weight of this lubricating composition.

This solid lubricant may contain boron oxide which derives the lubricity inherent in h-BN by being contained in that h-BN and contributes to the lowering of friction particularly in a high-temperature region; however, the solid lubricant may not contain the boron oxide. Even in such cases, the hydrated alumina among the components of the solid lubricant exhibits an effect in the formation of a firm coating layer by improving the adhesiveness of the solid lubricant onto the heat-resistant material surface, and exhibits the role of deriving the lubricity of h-BN by promoting sliding between layers of plate crystals of h-BN.

In the manufacturing process, this solid lubricant is used in the form of an aqueous dispersion in which an h-BN powder and a boron oxide powder are dispersedly contained in an alumina sol in which hydrated alumina particles are dispersedly contained in water serving as a dispersion medium and containing an acid and whose hydrogen ion concentration (pH) exhibits 2 to 3, the aqueous dispersion dispersedly containing as a solid content 30 to 50% by weight of a lubricating composition containing 70 to 85% by weight of the h-BN powder, 0.1 to 10% by weight of boron oxide, and 5 to 20% by weight of hydrated alumina. Further, this aqueous dispersion may be one in which 30 to 50% by weight of a lubricating composition is dispersedly contained as a solid content, the lubricating composition containing 70 to 85% by weight of the h-BN, 0.1 to 10% by weight of boron oxide, and 5 to 20% by weight of hydrated alumina, as well as PTFE dispersedly contained at a ratio of not more than 200 parts by weight, preferably 50 to 150 parts by weight, with respect to 100 parts by weight of that lubricating composition. The h-BN, the boron oxide, and PTFE for forming the aqueous dispersion are preferably as fine powders as possible, and fine powders with an average particle size of 10 μm or less, more preferably 0.5 μm or less, are suitably used as these powders.

The acid which is contained in water serving as a dispersion medium for the alumina sol in the aqueous dispersion acts as a deflocculant for stabilizing the alumina sol. As the acid, it is possible to cite inorganic acids such as hydrochloric acid, nitric acid, sulfuric acid, and amidesulfuric acid, but nitric acid, in particular, is preferable.

The hydrated alumina for forming the alumina sol in the aqueous dispersion is a compound which is expressed by a composition formula: $Al_2O_3 \cdot nH_2O$ (in the composition formula, $0<n<3$). In this composition formula, n is normally a number exceeding 0 (zero) and less than 3, preferably 0.5 to 2, more preferably 0.7 to 1.5 or thereabouts. As the hydrated alumina, it is possible to cite, for example, alumina monohydrate (aluminum hydroxide oxide) such as boehmite ($Al_2O_3 \cdot nH_2O$) and diaspore ($Al_2O_3 \cdot H_2O$), alumina trihydrate such as gibbsite ($Al_2O_3 \cdot 3H_2O$) and bayerite ($Al_2O_3 \cdot 3H_2O$), pseudoboehmite, and the like.

Next, referring to the drawings, a description will be given of a method of manufacturing the spherical annular seal member 35 composed of the above-described constituent materials.

Figure 3:
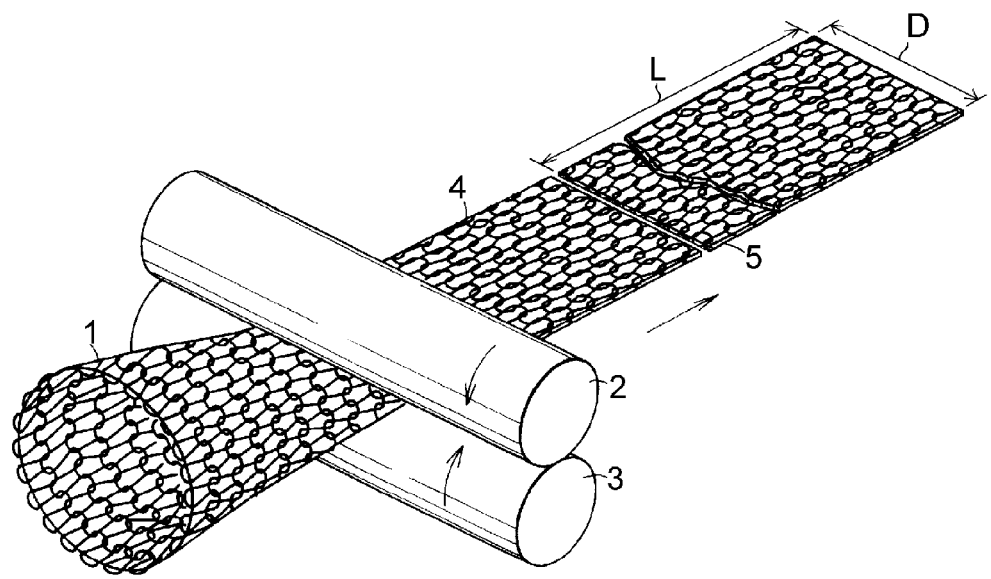
FIG. 3 is a view explaining a method of forming a reinforcing member in a process of manufacturing the spherical annular seal member in accordance with the present invention.

(First Process) As shown in FIG. 3, a hollow cylindrical knitted metal wire net 1, which is formed by knitting a fine metal wire with a diameter of 0.28 to 0.32 mm into a cylindrical shape and whose mesh size is 4 to 6 mm long and 3 to 5 mm wide or thereabouts (see FIG. 4), is passed between rollers 2 and 3 to thereby fabricate a belt-shaped metal wire net sheet 4 having a width D, and this metal wire net sheet 4 is cut into a predetermined length L.

Figure 5:
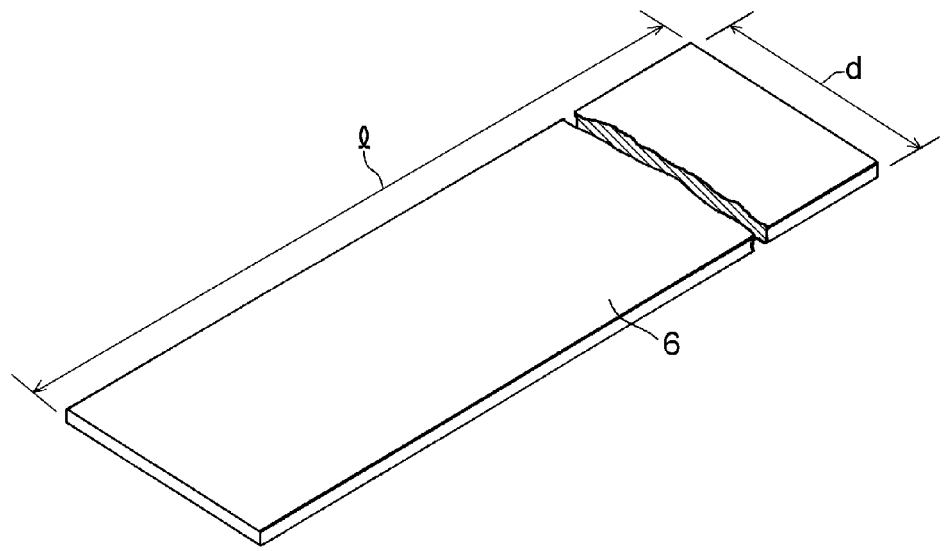
FIG. 5 is a perspective view of a heat-resistant material in the process of manufacturing the spherical annular seal member in accordance with the present invention.

(Second Process) As shown in FIG. 5, a sheet-like heat-resistant material (a heat-resistant material composed of expanded graphite or expanded graphite including at least one of a phosphoric acid and a phosphate) 6 is prepared which has a width identical to or slightly smaller than the width D of the metal wire net sheet 4, a length 1 of from 1.30×L mm to 2.70×L mm with respect to the length L of the metal wire net sheet 4, a density of from 1 to 1.5 $Mg/m^3$, and a thickness of from 0.3 to 0.6 mm.

Figure 6:
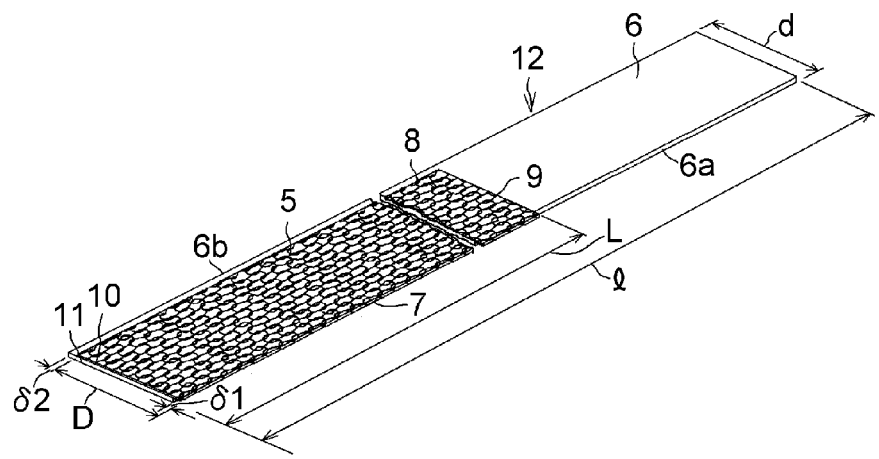
FIG. 6 is a perspective view of a superposed assembly in the process of manufacturing the spherical annular seal member in accordance with the present invention.

(Third Process) A superposed assembly 12 in which the heat-resistant material 6 and the reinforcing member 5 are superposed one on top of the other is obtained as follows: As shown in FIG. 6, the reinforcing member 5 is made to project in the widthwise direction from the heat-resistant material 6 such that the length from one widthwise end 6a of the heat-resistant material 6 to one widthwise end 7 of the reinforcing member 5 becomes δ1 (amount of projection δ1), the heat-resistant material 6 is made to project in the widthwise direction from the reinforcing member 5 such that the length from the other widthwise end 8 of the reinforcing member 5 to the other widthwise end 6b of the heat-resistant material 6 becomes δ2 (amount of projection δ2), the heat-resistant material 6 is made to project from one longitudinal end 9 of the reinforcing member 5 by a maximum of from 0.3×L to 1.7×L, and the other longitudinal end 10 of the reinforcing member 5 and a longitudinal end 11 of the heat-resistant material 6 corresponding to that end 10 are made to agree with each other.

Figure 7:
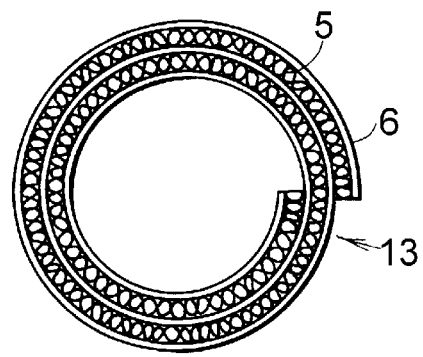
FIG. 7 is a plan view of a tubular base member in the process of manufacturing the spherical annular seal member in accordance with the present invention.
Figure 8:
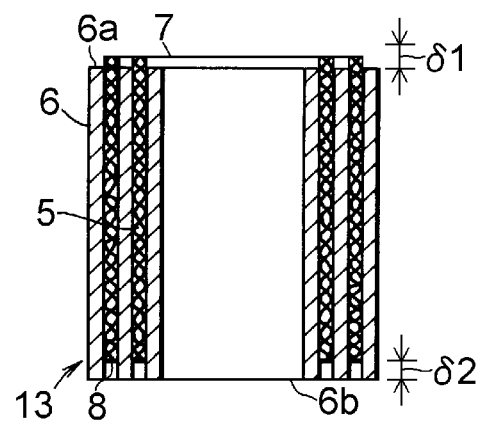
FIG. 8 is a vertical cross-sectional view of the tubular base member shown in FIG. 7.

(Fourth Process) As shown in FIG. 7, the superposed assembly 12 is convoluted with the heat-resistant material 6 placed on the inner side such that heat-resistant material 6 is convoluted with one more turn, thereby forming a tubular base member 13 in which the heat-resistant material 6 is exposed on both the inner peripheral side and the outer peripheral side. As the heat-resistant material 6, one is prepared in advance which has a length 1 of from 1.30×L to 2.70×L with respect to the length L of the reinforcing member 5 so that the number of winding turns of the heat-resistant material 6 in the tubular base member 13 becomes greater than the number of winding turns of the reinforcing member 5. In the tubular base member 13, as shown in FIG. 8, the reinforcing member 5 on its one widthwise end 7 side projects in the widthwise direction by δ1 from the one end 6a of the heat-resistant material 6, while the heat-resistant material 6 on its other widthwise end 6b side projects in the widthwise direction by δ2 from the other end 8 of the reinforcing member 5.

Figure 9:
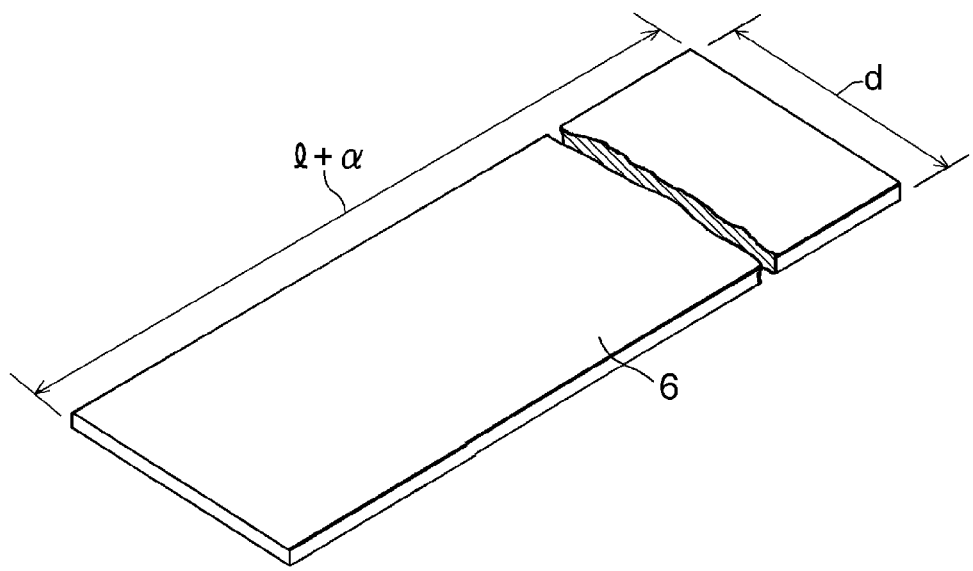
FIG. 9 is a perspective view of the heat-resistant material in the process of manufacturing the spherical annular seal member in accordance with the present invention.

(Fifth Process) Another heat-resistant material 6 such as the one shown in FIG. 9 is separately prepared which is similar to the above-described heat-resistant material 6 and has a width d and has a length l+α of such a measure as to be able to be wound around the tubular base member 13 by one turn.

(Sixth Process) The following aqueous dispersion is prepared: an aqueous dispersion in which an h-BN powder and a boron oxide powder are dispersedly contained in an alumina sol in which hydrated alumina particles are dispersedly contained in water serving as a dispersion medium and containing nitric acid acting as a deflocculant and whose hydrogen ion concentration (pH) exhibits 2 to 3, the aqueous dispersion dispersedly containing as a solid content 30 to 50% by weight of a lubricating composition containing 70 to 85% by weight of the h-BN, 0.1 to 10% by weight of boron oxide, and 5 to 20% by weight of hydrated alumina; or an aqueous dispersion in which 30 to 50% by weight of a lubricating composition is dispersedly contained as a solid content, the lubricating composition containing 70 to 85% by weight of the h-BN, 0.1 to 10% by weight of boron oxide, and 5 to 20% by weight of hydrated alumina, as well as a PTFE powder contained at a ratio of not more than 200 parts by weight, preferably 50 to 150 parts by weight, with respect to 100 parts by weight of that lubricating composition.

Figure 10:
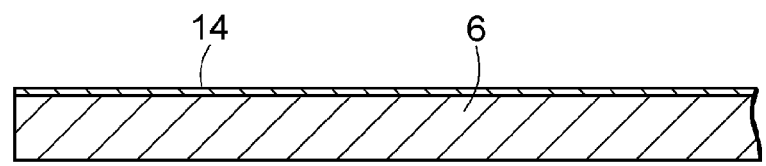
FIG. 10 is a cross-sectional view of the heat-resistant material having a coating layer of a solid lubricant in the process of manufacturing the spherical annular seal member in accordance with the present invention.

An aqueous dispersion (21 to 25.5% by weight of h-BN, 0.03 to 3% by weight of boron oxide, 1.5 to 6% by weight of hydrated alumina, and 70% by weight of water), which dispersedly contains as a solid content 30% by weight of a lubricating composition containing 70 to 85% by weight of h-BN, 0.1 to 10% by weight of boron oxide, and 5 to 20% by weight of hydrated alumina, is applied to one surface of the heat-resistant material 6, shown in FIG. 9, by means of brushing, roller coating, spraying, or the like, and this is dried to thereby fabricate a coating layer 14 of the solid lubricant constituted by that lubricating composition, as shown in FIG. 10.

Alternatively, an aqueous dispersion (7 to 17% by weight of h-BN, 0.009 to 2% by weight of boron oxide, 0.5 to 4% by weight of hydrated alumina, 10 to 20% by weight of PTFE, and 70% by weight of water), in which 30% by weight of a lubricating composition is dispersedly contained as a solid content, the lubricating composition containing 70 to 85% by weight of h-BN, 0.1 to 10% by weight of boron oxide, and 5 to 20% by weight of hydrated alumina, as well as a PTFE powder dispersedly contained at a ratio of not more than 200 parts by weight, preferably 50 to 150 parts by weight, with respect to 100 parts by weight of that lubricating composition, i.e., the lubricating composition containing 23.3 to 56.7% by weight of h-BN, 0.03 to 6.7% by weight of boron oxide, 1.7 to 13.3% by weight of hydrated alumina, and 33.3 to 66.7% by weight of PTFE, is applied to one surface of the heat-resistant material 6 shown in FIG. 9, by means of brushing, roller coating, spraying, or the like, and this is dried to thereby fabricate the coating layer 14 of the solid lubricant constituted by that lubricating composition such, as shown in FIG. 10.

(Seventh Process)

Figure 11:
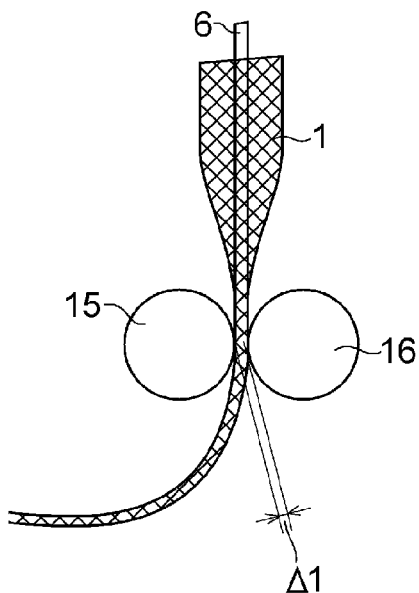
FIG. 11 is a view explaining a first method of forming an outer-layer forming member in the process of manufacturing the spherical annular seal member in accordance with the present invention.
Figure 12:
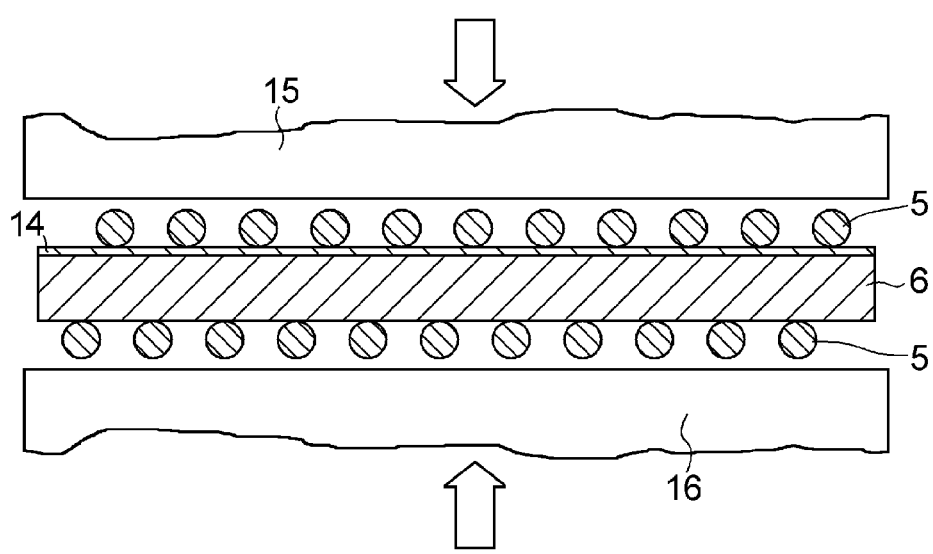
FIG. 12 is a view explaining the first method of forming the outer-layer forming member in the process of manufacturing the spherical annular seal member in accordance with the present invention.
Figure 13:
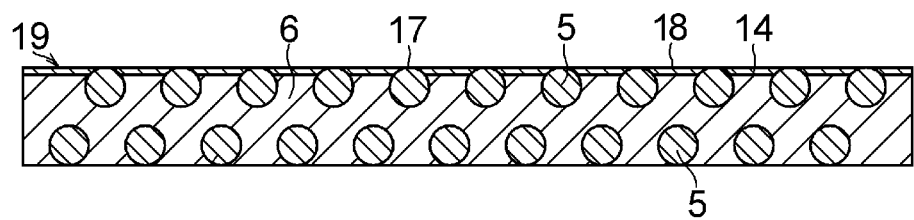
FIG. 13 is a vertical cross-sectional view of the outer-layer forming member which is obtained by the first forming method in the process of manufacturing the spherical annular seal member in accordance with the present invention.

<First Method> As shown in FIGS. 11 to 13, the heat-resistant material 6 having the coating layer 14 of the solid lubricant is continuously inserted (see FIG. 11) into the hollow cylindrical knitted metal wire net 1 obtained by continuously knitting a fine metal wire with a wire diameter of 0.28 to 0.32 mm by a knitting machine (not shown in the drawings). The hollow cylindrical knitted metal wire net 1 with the heat-resistant material 6 inserted therein is fed, starting with its insertion start end side, into a nip Δ1 between a pair of cylindrical rollers 15 and 16 each having a smooth cylindrical outer peripheral surface, so as to be integrated by being pressurized in the thicknesswise direction of the heat-resistant material 6 (see FIG. 12), thereby filling the meshes of the metal wire net sheet 4 of the reinforcing member 5 for the outer layer with the heat-resistant material 6 and the coating layer 14 of the solid lubricant formed on the surface of the heat-resistant material 6. Thus, a flattened outer-layer forming member 19 is fabricated on the surface of which surface 17 constituted by the reinforcing member 5 for the outer layer and surface 18 constituted by the solid lubricant are exposed in mixed form (see FIG. 13).

Figure 14:
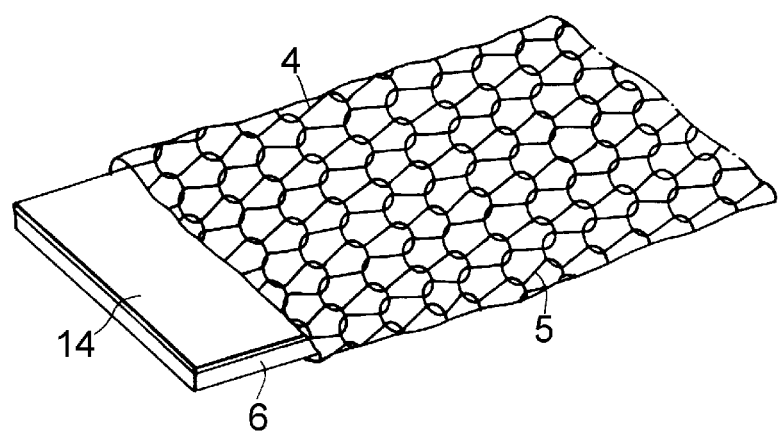
FIG. 14 is a view explaining a second method of forming the outer-layer forming member in the process of manufacturing the spherical annular seal member in accordance with the present invention.
Figure 15:
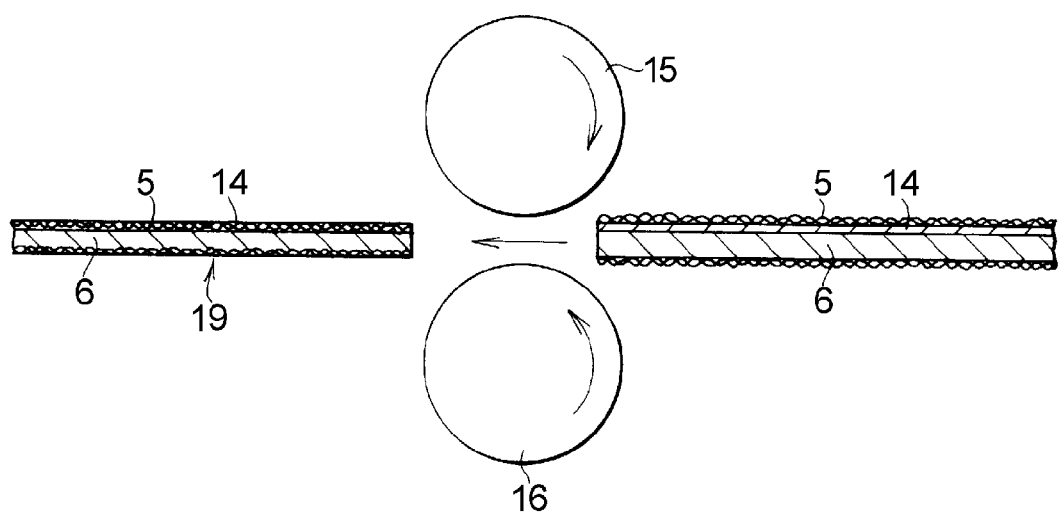
FIG. 15 is a view explaining the second method of forming the outer-layer forming member in the process of manufacturing the spherical annular seal member in accordance with the present invention.

<Second Method> The reinforcing member 5 constituted by the metal wire net sheet 4 described in the first process is separately prepared, and, as shown in FIG. 14, the heat-resistant material 6 having the coating layer 14 of the solid lubricant is inserted into the reinforcing member 5 for the outer layer constituted by the metal wire net sheet 4, and, as shown in FIG. 15, this assembly is fed into the nip Δ1 between cylindrical rollers 15 and 16 so as to be integrated by being pressurized in the thicknesswise direction of the heat-resistant material 6, thereby filling the meshes of the metal wire net sheet 4 of the reinforcing member 5 for the outer layer with the heat-resistant material 6 and the coating layer 14 of the solid lubricant formed on the surface of that heat-resistant material 6. Thus, the flattened outer-layer forming member 19 is fabricated on the surface of which the surface 17 constituted by the reinforcing member 5 for the outer layer and the surface 18 constituted by the solid lubricant are exposed in mixed form.

<Third Method> A plain woven metal wire net sheet 4 is prepared as a woven metal wire net sheet which is formed by weaving a fine metal wire with a diameter of 0.28 to 0.32 mm. The reinforcing member 5 for the outer layer made from this plain woven metal wire net sheet 4 is cut to a predetermined length and width, and two of these reinforcing members 5 are prepared. The heat-resistant material 6 having the coating layer 14 of the solid lubricant is inserted between the two reinforcing members 5 for the outer layer, and this assembly is fed into the nip Δ1 between the pair of cylindrical rollers 15 and 16 so as to be integrated by being pressurized in the thicknesswise direction of the heat-resistant material 6, thereby filling the meshes of the metal wire net sheet 4 of the reinforcing member 5 for the outer layer with the heat-resistant material 6 and the coating layer 14 of the solid lubricant formed on the surface of the heat-resistant material 6. Thus, the flattened outer-layer forming member 19 is fabricated on the surface of which the surface 17 constituted by the reinforcing member 5 for the outer layer and the surface 18 constituted by the solid lubricant are exposed in mixed form.

In the above-described first, second, and third methods, 0.4 to 0.6 mm or thereabouts is suitable as the nip Δ1 between the pair of rollers.

Figure 16:
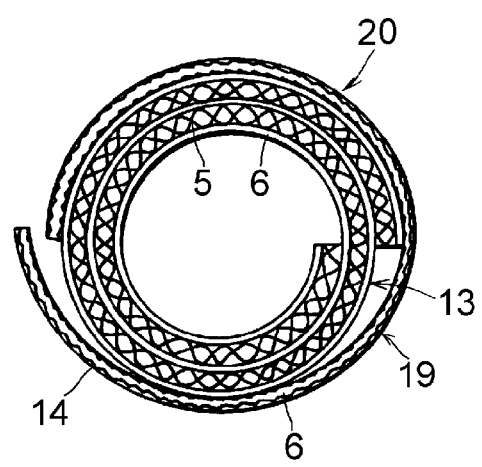
FIG. 16 is a plan view of a cylindrical preform in the process of manufacturing the spherical annular seal member in accordance with the present invention.

(Eighth Process) The outer-layer forming member 19 thus obtained is wound around an outer peripheral surface of the tubular base member 13 with its coating layer 14 placed on the outer side, thereby preparing a cylindrical preform 20 as shown in FIG. 16.

Figure 17:
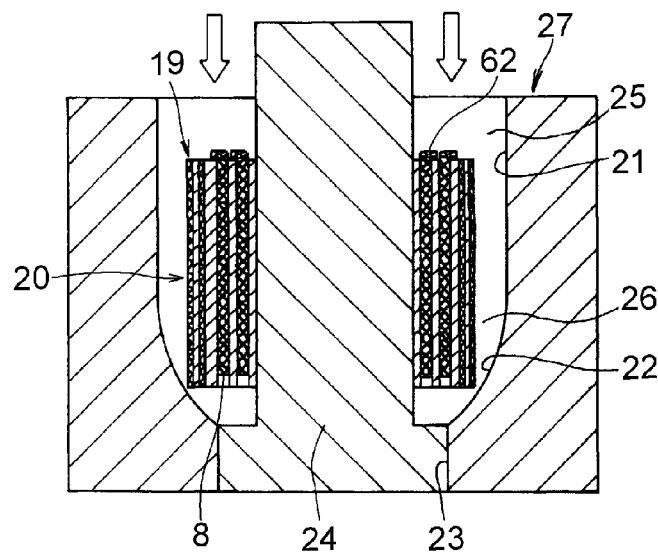
FIG. 17 is a cross-sectional view illustrating a state in which the cylindrical preform is inserted in a die in the process of manufacturing the spherical annular seal member in accordance with the present invention.

(Ninth Process) A die 27 such as the one shown in FIG. 17 is prepared which has on its inner surface a cylindrical wall surface 21, a partially concave spherical wall surface 22 continuing from the cylindrical wall surface 21, and a through hole 23 continuing from the partially concave spherical wall surface 22, and in which a hollow cylindrical portion 25 and a spherical annular hollow portion 26 continuing from the hollow cylindrical portion 25 are formed inside it as a stepped core 24 is fittingly inserted in the through hole 23. Then, the cylindrical preform 20, in which the portion of the metal wire net sheet 4 projecting in the axial direction X with the amount of projection δ1 from the one widthwise end 6a of the heat-resistant material 6 in the reinforcing member 5 of the cylindrical preform 20 is bent radially outwardly, as shown in FIG. 17, is fitted over the stepped core 24 of the die 27.

The cylindrical preform 20 disposed in the hollow cylindrical portion 25 and the spherical annular hollow portion 26 of the die 27 is subjected to compression forming under a pressure of 98 to 294 N/mm² (1 to 3 tons/cm²) in the direction of the core axis. Thus, the spherical annular seal member 35 is fabricated which has the spherical annular base member 33 which is defined by the cylindrical inner surface 29 forming the through hole 28, the partially convex spherical sliding surface 39, and annular end faces 31 and 32 on large- and small-diameter sides of the partially convex spherical sliding surface 39, and which includes the spherical annular base member body 61 and the outer layer 34 formed integrally on the partially convex spherical surface 30 of the spherical annular base member body 61, as shown in FIGS. 1 and 2.

By means of this compression forming, the spherical annular base member 33 is provided with the spherical annular base member body 61 which is cylindrically shaped and has the partially convex spherical surface 30 on its outer peripheral side, as well as the outer layer 34 formed integrally on the partially convex spherical surface 30 of the spherical annular base member body 61. Moreover, the spherical annular base member 33 includes the reinforcing member 5 made from the convoluted and compressed metal wire net sheet 4 and the heat-resistant material 6 containing expanded graphite and compressed in such a manner as to fill meshes of the metal wire net sheet 4 and to be integrated with the metal wire net sheet 4 in mixed form. The spherical annular base member body 61 is constructed so as to be provided with structural integrity as the heat-resistant material 6 and the metal wire net sheet 4 of the reinforcing member 5 are compressed to each other and intertwined with each other. In the outer layer 34, the heat-resistant material 6 containing expanded graphite, the solid lubricant constituted by the lubricating composition containing h-BN and hydrated alumina or additionally containing PTFE, and the reinforcing member 5 made from the metal wire net sheet 4 are compressed such that the solid lubricant and the heat-resistant material 6 are filled in the meshes of the metal wire net sheet 4 of the reinforcing member 5, and the solid lubricant, the heat-resistant material 6, and the reinforcing member 5 are integrated in mixed form, an outer surface 36 of the outer layer 34 being thus formed into the partially convex spherical sliding surface 39 serving as a smooth surface in which surface 37 constituted by the reinforcing member 5 and surface 38 constituted by the solid lubricant are present in mixed form. That portion of the metal wire net sheet 4 which extends along the annular end face 31 and is exposed to the outside partially and discretely at that annular end face 31 constitutes the bent extended portion 62 of the innermost circumferential metal wire net sheet 4 extending along the cylindrical inner surface 29. The bent extended portion 62, which is the portion of the innermost circumferential metal wire net sheet 4 projecting in the axial direction X with the amount of projection δ1 from the one widthwise end 6a of the heat-resistant material 6 in the tubular base member 13, and which corresponds to the bent portion at the time when the cylindrical preform 20 is fitted over the stepped core 24 of the die 27, extends to the proximal side of the annular end 52 of the partially convex spherical sliding surface 39.

In the spherical annular base member body 61 and the outer layer 34 of the fabricated spherical annular seal member 35, the reinforcing member 5 constituted by the metal wire net sheet 4 is contained at a ratio of 40 to 65% by weight, and the heat-resistant material 6 containing expanded graphite and the solid lubricant are contained at a ratio of 35 to 60% by weight. The heat-resistant material 6 and the solid lubricant in the spherical annular base member body 61 and the outer layer 34 have a density of 1.20 to 2.00 Mg/m³.

In addition, if attention is focused on the outer layer 34 alone, the reinforcing member 5 constituted by the metal wire net sheet 4 is contained at a ratio of 60 to 75% by weight, and the heat-resistant material 6 containing expanded graphite and the solid lubricant are contained at a ratio of 25 to 40% by weight.

Figure 18:
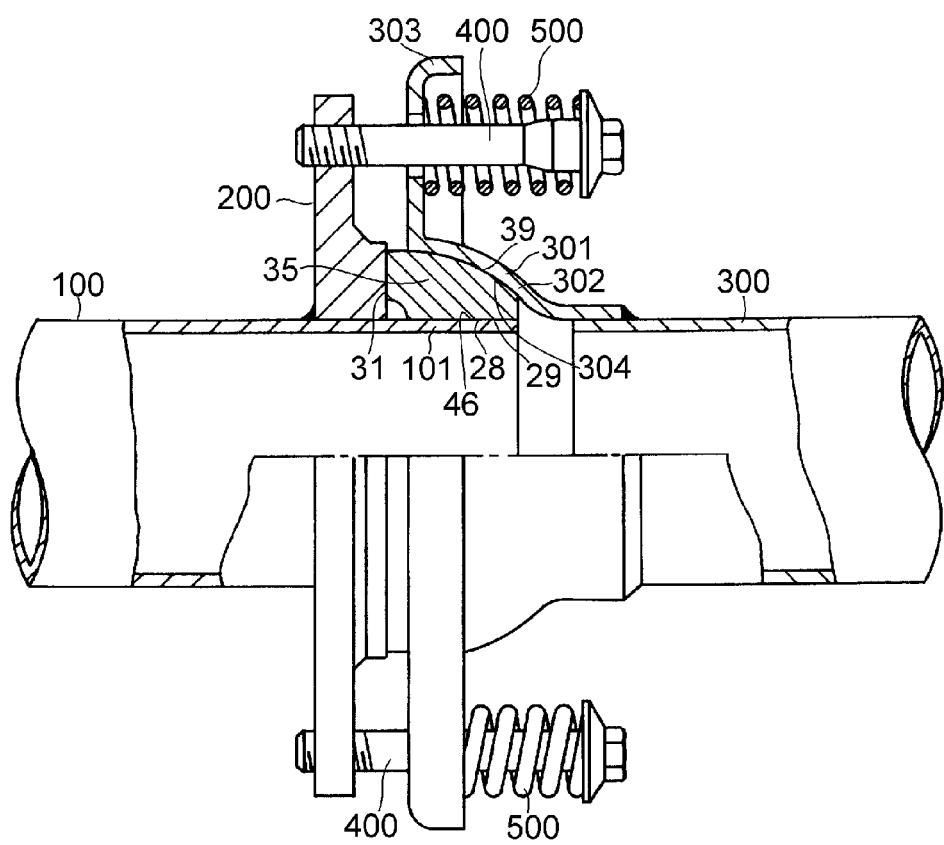
FIG. 18 is a vertical cross-sectional view of an exhaust pipe spherical joint incorporating the spherical annular seal member in accordance with the present invention.

In the exhaust pipe spherical joint, shown in FIG. 18, in which the spherical annular seal member 35 is used by being incorporated therein, a flange 200 is provided uprightly on an outer peripheral surface of the upstream-side exhaust pipe 100, which is connected to the engine side, by leaving a pipe end portion 101. The spherical annular seal member 35 is press fitted over the pipe end portion 101 at the cylindrical inner surface 29 defining the through hole 28, and is seated with its large-diameter side annular end face 31 abutting against that flange 200. A flared portion 301, which integrally has a concave spherical surface portion 302 and a flange portion 303 continuous from the concave spherical surface portion 302, is secured to a downstream-side exhaust pipe 300 which is disposed in such a manner as to oppose the upstream-side exhaust pipe 100 in the axial direction X and is connected to the muffler side. An inner surface 304 of the concave spherical surface portion 302 is in slidable contact with the partially convex spherical sliding surface 39 in which the surface 37 constituted by the reinforcing member 5 and the surface 38 constituted by the solid lubricant are present in mixed form in the outer surface 36 of the outer layer 34 of the spherical annular seal member 35. The downstream-side exhaust pipe 300 is constantly urged resiliently toward the upstream-side exhaust pipe 100 by means of a pair of bolts 400 each having one end fixed to the flange 200 and another end arranged by being inserted in the flange portion 303 of the flared portion 301, and by means of a pair of coil springs 500 each arranged between an enlarged head of the bolt 400 and the flange portion 303.

The exhaust pipe spherical joint shown in FIG. 18 is arranged such that relative angular displacements occurring in the upstream- and downstream-side exhaust pipes 100 and 300 are adapted to be allowed by sliding contact between the smooth partially convex spherical sliding surface 39 serving as a sliding surface of the outer layer 34 of the spherical annular seal member 35 and the inner surface 304 of the concave spherical surface portion 302 of the flared portion 301 formed at the end of the downstream-side exhaust pipe 300.

The spherical annular seal member 35 in accordance with this embodiment has the spherical annular base member 33 which is defined by the cylindrical inner surface 29 forming the through hole 28, the partially convex spherical sliding surface 39, and the annular end faces 31 and 32 on the large- and small-diameter sides of the partially convex spherical sliding surface 39. Further, the spherical annular base member 33 includes the reinforcing member 5 made from the convoluted and compressed metal wire net sheet 4 and the heat-resistant material 6 containing expanded graphite and compressed in such a manner as to fill meshes of the metal wire net sheet 4 and to be integrated with the metal wire net sheet 4 in mixed form. Furthermore, that portion of the metal wire net sheet 4 which extends along the annular end face 31 and is exposed to the outside partially and discretely at that annular end face 31 constitutes the bent extended portion 62 of the innermost circumferential metal wire net sheet 4 extending along the cylindrical inner surface 29, and the bent extended portion 62 extends to the proximal side of the annular end 52 of the partially convex spherical sliding surface 39. Therefore, when the pipe end portion 101 of the upstream-side exhaust pipe 100 is press fitted into the through hole 28 of the spherical annular seal member 35, that bent extended portion 62 acts as a hampering portion which resists the frictional movement with respect to the heat-resistant material 6, containing expanded graphite, of the innermost circumferential metal wire net sheet 4 extending along the cylindrical inner surface 29, and is able to firmly bind the reinforcing member 5 constituted by the metal wire net sheet 4 to the heat-resistant material 6 compressed and containing expanded graphite. Thus, it is possible to prevent positional displacement between the innermost circumferential metal wire net sheet 4 and the heat-resistant material 6 containing expanded graphite around that innermost circumferential metal wire net sheet 4, thereby making it possible to suitably incorporate the spherical annular seal member 35 into the exhaust pipe spherical joint.

According to the spherical annular seal member 35, the spherical annular seal member 35 has the outer layer 34 formed on the outer peripheral side of the spherical annular base member body 61, and, in the outer layer 34, the heat-resistant material 6 containing expanded graphite, the solid lubricant consisting of a lubricating composition containing at least h-BN and hydrated alumina, and the reinforcing member 5 made from the metal wire net sheet 4 are compressed such that the solid lubricant and the heat-resistant material 6 are filled in the meshes of the reinforcing member 5, and such that the solid lubricant, the heat-resistant material 6, and the reinforcing member 5 are integrated in mixed form. The outer surface 36 of the outer layer 34 forms the partially convex spherical sliding surface 39, and this partially convex spherical sliding surface 39 is formed into a smooth surface in which the surface 37 constituted by the reinforcing member 5 and the surface 38 constituted by the solid lubricant are present in mixed form. Accordingly, it is possible to avoid the dropping off of the solid lubricant, with the result that since the sliding with the mating member takes place at the partially convex spherical sliding surface 39 which is a smooth surface where the solid lubricant and the reinforcing member 5 are present in mixed form, it is possible to prevent the generation of abnormal frictional noise as practically as possible.

Figure 19:
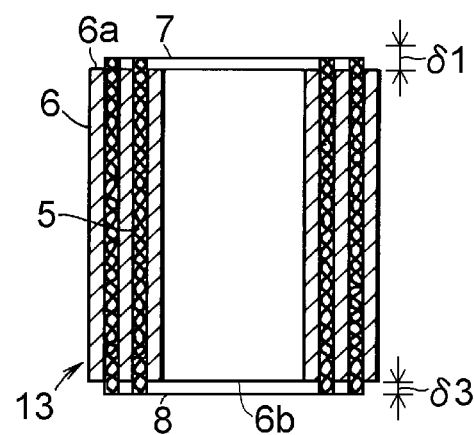
FIG. 19 is a plan view of another tubular base member in the process of manufacturing the spherical annular seal member in accordance with the present invention.

In the spherical annular seal member 35, the metal wire net sheet 4 constituted by the bent extended portion 62 of the innermost circumferential metal wire net sheet 4 extending along the cylindrical inner surface 29 is made to extend along the annular end face 31 and is mixed with the heat-resistant material 6 containing expanded graphite at that annular end face 31 so as to be exposed to the outside partially and discretely together with that heat-resistant material 6. In substitution therefor or in conjunction therewith, the following arrangement may be adopted: As shown in FIG. 19, for example, a tubular base member 13 is formed which has the reinforcing member 5 projecting by δ1 in the widthwise direction from the one widthwise end 6a of the heat-resistant material 6 on the one widthwise end 7 side and projecting by δ3 in the widthwise direction from the other widthwise end 6b of the heat-resistant material 6 on the other widthwise end 8 side as well. After those portions of the metal wire net sheet 4 that project in the axial direction X with the amounts of projection δ1 and δ3 from the one widthwise end 6a and the other widthwise end 6b, respectively, of the heat-resistant material 6 in the reinforcing member 5 are bent radially outwardly, a cylindrical preform 20 formed from such a tubular base member 13 shown in FIG. 19 is fitted over the stepped core 24 of the die 27 and is subjected to compression forming in the same way as described above, thereby forming the spherical annular seal member 35, such that the metal wire net sheet 4 constituted by the bent extended portion on the end 8 side of the innermost circumferential metal wire net sheet 4 extending along the cylindrical inner surface 29 is made to extend to a proximal side of a small-diameter side annular end 65 of the partially convex spherical sliding surface 39 along the annular end face 32 and is mixed with the heat-resistant material 6 containing expanded graphite at that annular end face 32 so as to be exposed to the outside partially and discretely together with that heat-resistant material 6. In the case of such an example, when the pipe end portion 101 of the upstream-side exhaust pipe 100 is withdrawn from the through hole 28 of the spherical annular seal member 35 during readjustment, that bent extended portion acts as a hampering portion which resists the frictional movement with respect to the heat-resistant material 6, containing expanded graphite, of the innermost circumferential metal wire net sheet 4 extending along the cylindrical inner surface 29, and is able to firmly bind the reinforcing member 5 constituted by the metal wire net sheet 4 to the heat-resistant material 6 compressed and containing expanded graphite. Thus, it is possible to prevent positional displacement between the innermost circumferential metal wire net sheet 4 and the heat-resistant material 6 containing expanded graphite around that innermost circumferential metal wire net sheet 4, thereby making it possible to suitably incorporate the spherical annular seal member 35 into the exhaust pipe spherical joint during readjustment.

Figure 20:
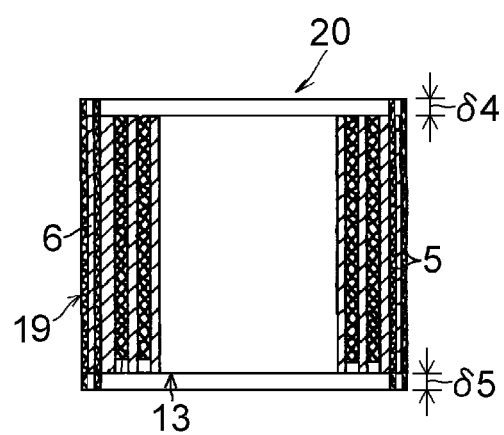
FIG. 20 is a plan view of still another tubular base member in the process of manufacturing the spherical annular seal member in accordance with the present invention.
Figure 21:
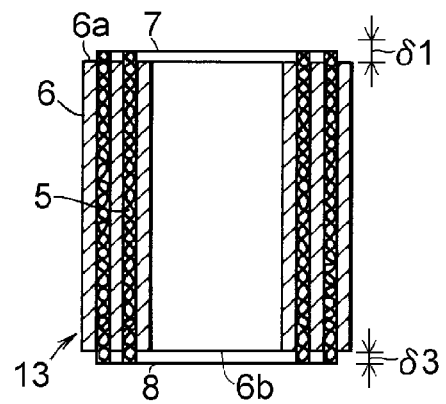
FIG. 21 is a plan view of a further tubular base member in the process of manufacturing the spherical annular seal member in accordance with the present invention; and Parts (a) and (b) of FIG. 22 are explanatory views of another embodiment of the present invention.

In the above-described spherical annular seal member 35, the metal wire net sheet 4 constituted by the bent extended portion 62 of the innermost circumferential metal wire net sheet 4 extending along the cylindrical inner surface 29 is made to extend along at least one of the annular end face 31 and the annular end face 32 and is mixed with the heat-resistant material 6 containing expanded graphite at at least one of the annular end face 31 and the annular end face 32 so as to be exposed to the outside partially and discretely together with that heat-resistant material 6. In substitution therefor or in conjunction therewith, the following arrangement may be adopted: As shown in FIG. 20, for example, a cylindrical preform 20 provided with the outer-layer forming member 19 having the reinforcing member 5 projecting by δ4 and δ5 in the widthwise direction from the respective widthwise ends of the heat-resistant material 6 at both widthwise ends is formed. After those portions of the metal wire net sheet 4 that project in the axial direction X with the amounts of projection δ4 and δ5, respectively, in the reinforcing member 5 are bent radially inwardly so as to form bent extended portions, this cylindrical preform 20 is fitted over the stepped core 24 of the die 27 and is subjected to compression forming in the same way as described above, thereby forming the spherical annular seal member 35, such that the metal wire net sheet 4 constituted by the bent extended portion of the outermost circumferential metal wire net sheet 4 extending along the partially convex spherical sliding surface 30 is made to extend to proximal sides of axial ends 57 and 59 of the cylindrical inner surface 29 at the large- and small-diameter side annular end faces 31 and 32 along the large- and small-diameter side annular end faces 31 and 32 and is mixed with the heat-resistant material 6 containing expanded graphite at the respective annular end faces 31 and 32 so as to be exposed to the outside partially and discretely together with that heat-resistant material 6. In the case of such an example, in the sliding of the partially convex spherical sliding surface with respect to the mating member, that bent extended portion acts as a hampering portion which resists the frictional movement with respect to the heat-resistant material 6, containing expanded graphite, of the outermost circumferential metal wire net sheet 4 extending along the partially convex spherical sliding surface 30, and is able to firmly bind the reinforcing member 5 constituted by the metal wire net sheet 4 to the heat-resistant material 6 compressed and containing expanded graphite. Thus, it is possible to prevent positional displacement between the outermost circumferential metal wire net sheet 4 and the heat-resistant material 6 containing expanded graphite around that outermost circumferential metal wire net sheet 4, thereby making it possible to suitably incorporate the spherical annular seal member 35 into the exhaust pipe spherical joint.

In the case where the cylindrical preform 20 shown in FIG. 20 is used, each of both axial bent extended portions of the outermost circumferential metal wire net sheet 4 extending along the partially convex spherical sliding surface 30 extends along each of the corresponding large- and small-diameter side annular end faces 31 and 32, and is exposed to the outside partially and discretely at each of these annular end faces 31 and 32. However, it is also possible to use the cylindrical preform 20 provided with the outer-layer forming member 19 having the reinforcing member 5 which projects by δ4 or δ5 in the widthwise direction from only one end of the heat-resistant material 6. In this case, the bent extended portion, corresponding to the amount of projection δ4 or δ5, of the outermost circumferential metal wire net sheet 4 extending along the partially convex spherical sliding surface 30 extends along the corresponding one of the large- and small-diameter side annular end faces 31 and 32, and is exposed to the outside partially and discretely at that annular end faces 31 or 32.

Further, although, in the above-described embodiment, the reinforcing member 5 which projects in the widthwise direction from the end of the heat-resistant material 6, it is alternately possible to adopt an arrangement in which, by using the reinforcing member 5 which does not project in the widthwise direction from the end of the heat-resistant material 6 and has an identical width to the widthwise length of the heat-resistant material 6, and by the compression forming of the cylindrical preform 20 by means of the die 27, the metal wire net sheet 4 which extends along at least one annular end face of the large- and small-diameter side annular end faces 31 and 32 and is exposed to the outside partially and discretely at that one annular end face is formed into at least one of the bent extended portion of the innermost circumferential metal wire net sheet 4 extending along the cylindrical inner surface 29 and the bent extended portion of the outermost circumferential metal wire net sheet 4 extending along the partially convex spherical sliding surface 39.

Figure 22:
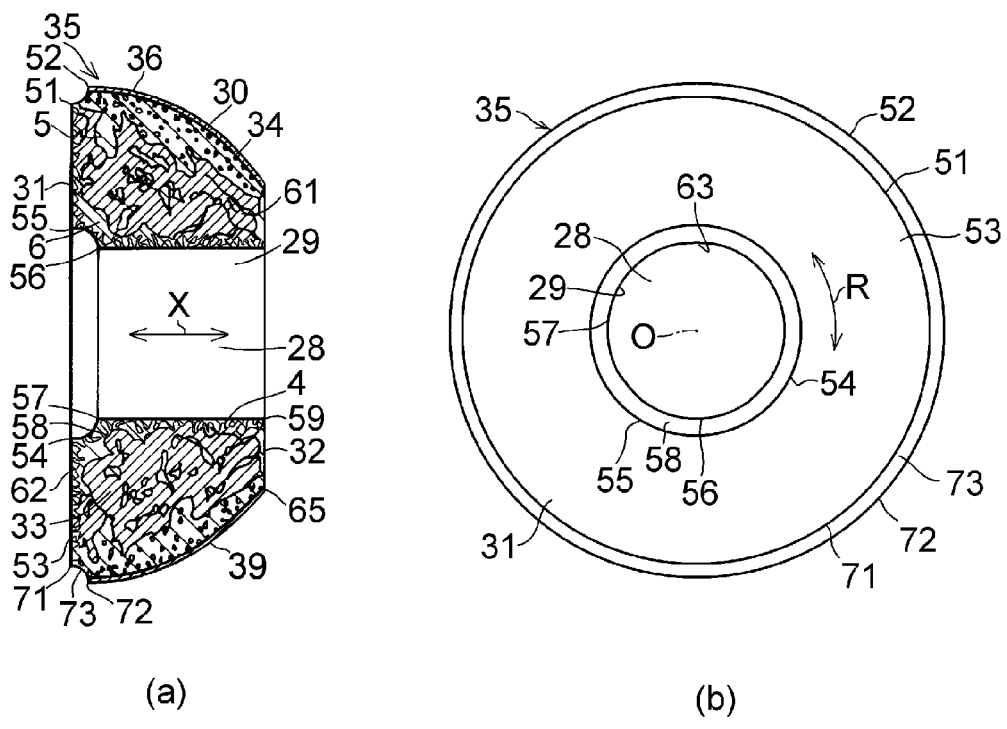

Further, the spherical annular seal member 35 may include, instead of the annular end face 31 having the annular flat end face portion 53 and the annular concave end face portion 58, for example, an annular flat end face which is continuously connected at the annular large-diameter edge 51 to the large-diameter side annular end 52 of the partially convex spherical sliding surface 39 and which is continuously connected at the annular small-diameter edge 54 to the annular end 57 in the axial direction X of the cylindrical inner surface 29. Furthermore, the spherical annular seal member 35 may have, in substitution for or in addition to the above-described arrangement, an annular concave end face portion 73 which is continuously connected at its small-diameter edge 71 to the large-diameter edge 51 and is continuously connected at its large-diameter edge 72 to the annular end 52 of the partially convex spherical sliding surface 39, as shown in parts (a) and (b) of FIG. 22. In such a case, the small-diameter edge 54 of the annular flat end face portion 53 may be continuously connected to the end 57 of the cylindrical inner surface 29 directly or via the concave end face portion 58.

Still further, the spherical annular seal member 35 may include the spherical annular base member body 61 which has the reinforcing member 5 and at least one of the solid lubricant and the heat-resistant material 6 containing expanded graphite, and in which the metal wire net sheet 4 of the reinforcing member 5 is exposed on the surface or in which the metal wire net sheet 4 is embedded.

DESCRIPTION OF REFERENCE NUMERALS

28: through hole
29: cylindrical inner surface
30: partially convex spherical surface
31, 32: annular end face
33: spherical annular base member
34: outer layer
35: spherical annular seal member
39: partially convex spherical sliding surface
62: bent extended portion

The invention claimed is:
1. A spherical annular seal member for use in an exhaust pipe joint, comprising:
a spherical annular base member defined by a cylindrical inner surface forming a through hole, a partially convex spherical sliding surface, and annular end faces on large- and small-diameter sides of said partially convex spherical sliding surface, wherein said spherical annular base member includes a heat-resistant material containing expanded graphite and compressed and a reinforcing member made from a convoluted and compressed metal wire net sheet, said heat-resistant material containing expanded graphite fills meshes of the compressed metal wire net sheet and is integrated with the metal wire net sheet in mixed form, and the metal wire net sheet which extends along at least one annular end face of said large- and small-diameter side annular end faces and is exposed to an outside partially and discretely at said one annular end face is constituted by a bent extended portion of an innermost circumferential metal wire net sheet extending along said cylindrical inner surface.

2. The spherical annular seal member according to claim 1, wherein said bent extended portion extends to a proximal side of the annular end on the large-diameter side of said partially convex spherical sliding surface.

3. The spherical annular seal member according to claim 1, wherein said bent extended portion extends to a proximal side of the annular end on the small-diameter side of said partially convex spherical sliding surface.

4. The spherical annular seal member according to claim 1, wherein said large-diameter side annular end face is constituted by an annular flat end face which is continuously connected at an annular large-diameter edge thereof to a large-diameter side annular end of said partially convex spherical sliding surface and which is continuously connected at an annular small-diameter edge thereof to one annular axial end of said cylindrical inner surface.

5. The spherical annular seal member according to claim 1, wherein said large-diameter side annular end face includes an annular flat end face portion which is continuously connected at its annular large-diameter edge to the large-diameter side annular end of said partially convex spherical sliding surface and an annular concave end face portion which is continuously connected at a large-diameter edge thereof to an annular small-diameter edge of said annular flat end face portion and is continuously connected at a small-diameter edge thereof to the one annular axial end of said cylindrical inner surface.

6. The spherical annular seal member according to claim 1, wherein said large-diameter side annular end face includes an annular flat end face portion which is continuously connected at its annular small-diameter edge to the one annular axial end of said cylindrical inner surface and an annular concave end face portion which is continuously connected at a small-diameter edge thereof to an annular large-diameter edge of said annular flat end face portion and is continuously connected at a large-diameter edge thereof to the large-diameter side annular end of said partially convex spherical sliding surface.

7. The spherical annular seal member according to claim 1, wherein said large-diameter side annular end face includes an annular concave end face portion which is continuously connected at its annular large-diameter edge to the large-diameter side annular end of said partially convex spherical sliding surface, an annular flat end face portion which is continuously connected at a large-diameter edge thereof to a small-diameter edge of said concave end face portion, and an annular concave end face portion which is continuously connected at a large-diameter edge thereof to an annular small-diameter edge of said annular flat end face portion and is continuously connected at a small-diameter edge thereof to the one annular axial end of said cylindrical inner surface.

8. The spherical annular seal member according to claim 1, wherein said spherical annular base member includes a spherical annular base member body and an outer layer formed on an outer peripheral side of said spherical annular base member body, and, in said outer layer, said heat-resistant material containing expanded graphite, a solid lubricant consisting of a lubricating composition containing at least hexagonal boron nitride and hydrated alumina, and said reinforcing member made from the metal wire net sheet are compressed such that said solid lubricant and said heat-resistant material are filled in the meshes of said reinforcing member, and such that said solid lubricant, said heat-resistant material, and said reinforcing member are integrated in mixed form, an outer surface of said outer layer forming said partially convex spherical sliding surface, said partially convex spherical sliding surface being formed into a smooth surface in which surface constituted by said reinforcing member and surface constituted by said solid lubricant are present in mixed form or into a smooth surface constituted by said solid lubricant.

9. The spherical annular seal member according to claim 8, wherein said lubricating composition contains a polytetrafluoroethylene resin.

10. The spherical annular seal member according to claim 8, wherein the hydrated alumina is selected from among alumina monohydrate, alumina trihydrate, and pseudoboehmite.

11. A spherical annular seal member for use in an exhaust pipe joint, comprising:
    a spherical annular base member defined by a cylindrical inner surface forming a through hole, a partially convex spherical sliding surface, and annular end faces on large- and small-diameter sides of said partially convex spherical sliding surface,
    wherein said spherical annular base member includes a heat-resistant material containing expanded graphite and compressed and a reinforcing member made from a convoluted and compressed metal wire net sheet, said heat-resistant material containing expanded graphite fills meshes of the compressed metal wire net sheet and is integrated with the metal wire net sheet in mixed form, and the metal wire net sheet which extends along at least one annular end face of said large- and small-diameter side annular end faces and is exposed to an outside partially and discretely at said one annular end face is constituted by a bent extended portion of an outermost circumferential metal wire net sheet extending along partially convex spherical sliding surface.

12. The spherical annular seal member according to claim 11, wherein said bent extended portion extends to a proximal side of an axial annular end of said cylindrical inner surface at said large-diameter side annular end face.

13. The spherical annular seal member according to claim 11, wherein said bent extended portion extends to a proximal side of another axial annular end of said cylindrical inner surface at said small-diameter side annular end face.

* * * * *